United States Patent [19]

Paitson

[11] 4,285,415
[45] Aug. 25, 1981

[54] ACOUSTIC IMPULSE GENERATOR

[76] Inventor: John L. Paitson, Drawer 2600, Galveston, Tex. 77552

[21] Appl. No.: 51,403

[22] Filed: Jun. 25, 1979

[51] Int. Cl.³ .................. G01V 1/137; G01V 1/38
[52] U.S. Cl. ..................................... 181/120; 367/144
[58] Field of Search .................. 181/106, 118, 120; 367/144

[56] References Cited
U.S. PATENT DOCUMENTS

| | | | |
|---|---|---|---|
| 2,083,695 | 6/1937 | Dull | 102/6 |
| 2,083,705 | 6/1937 | Harris | 102/6 |
| 3,276,534 | 10/1966 | Ewing et al. | 181/118 |
| 3,379,273 | 4/1968 | Chelminski | 181/120 |
| 3,638,752 | 2/1972 | Wakefield | 181/118 |
| 3,979,140 | 9/1976 | Silverman et al. | 367/144 |
| 4,049,078 | 9/1977 | Paitson et al. | 181/120 |
| 4,114,723 | 9/1978 | Paitson et al. | 181/120 |
| 4,180,139 | 12/1979 | Walker | 181/120 |

Primary Examiner—Nelson Moskowitz
Attorney, Agent, or Firm—Bernard A. Reiter

[57] ABSTRACT

Apparatus for controlling a release of pressurized fluid, to generate an acoustic or shock wave impulse for use in underwater reflection seismic surveys. Compressed air is supplied to the acoustic impulse generator and is used both to provide the compressed air acoustic impulse and to retain two piston members in sealing engagement with each other to maintain the compressed air within the apparatus. The two internal pistons are hollow, open-ended cylindrical members, and are adapted to slide axially within a cylindrical chamber and abut one another to preclude escape of compressed air. To fine the acoustic impulse generator, compressed air pressure holding the first piston member in position over a series of exhaust ports is suddenly reduced, causing that piston to shift within its chamber, exposing the ports to atmosphere and thereby emitting an acoustic impulse of compressed air. Immediately thereafter, residual air pressure within the device causes the second piston to shift in the same direction following the first piston to again close the exhaust ports and preclude further escape of compressed gas, thus defining an acoustic impulse of finite duration.

22 Claims, 3 Drawing Figures

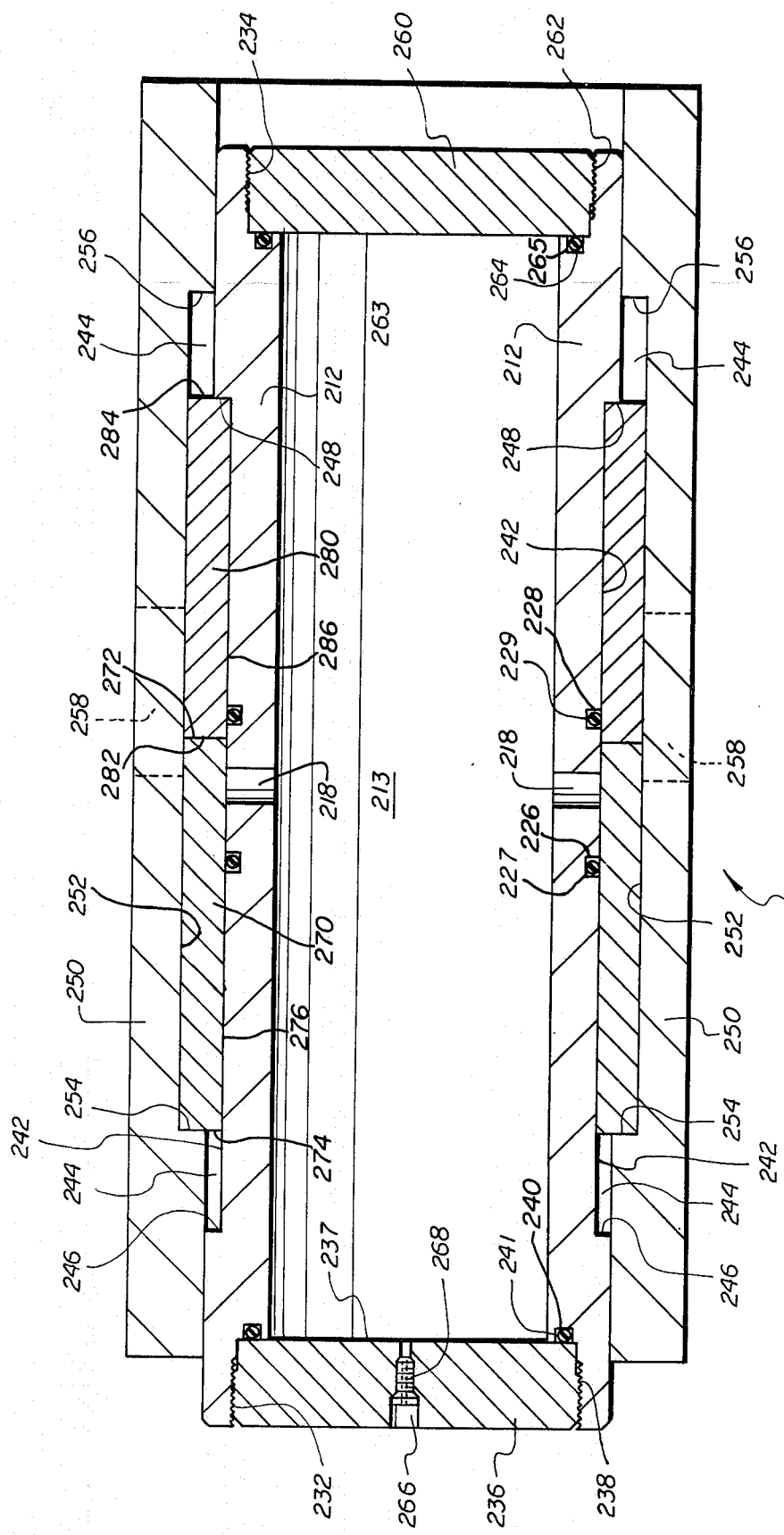

4,285,415

ACOUSTIC IMPULSE GENERATOR

BACKGROUND OF THE INVENTION

The present invention pertains to systems for underwater geophysical prospecting utilizing a means for producing a sound, or shock wave underwater and a device for detecting and recording the frequency and amplitude of the timed shock impulses as they reflect off of the geophysical structure beneath the sea.

Various devices have been used in an effort to create these micro-second timed sound or shock pulses, including explosives, the bursting of inflatable gas bags, high-voltage sparks and explosive gas mixtures, all posing obvious safety hazards. Pneumatic sound sources providing the timed shock waves are much more efficient in terms of controlling frequency, amplitude and "firing time," not to mention the high factor of safety as compared with previous methods.

Commonly in usage presently are a number of compressed air sound wave pulse generators. These devices generally comprise a piston within a cylinder constructed to release a certain amount of compressed gas in controlled time intervals by reciprocal movement of the piston, cylinder, sleeve or other valving-type mechanism therewith. An inherent shortcoming of compressed gas pulse generators of this reciprocating movement type is the fact that a finite time is required for the reciprocating valve mechanism (piston, sleeve, etc.) to move in one direction to open, to stop and to reverse direction to close. The inherent inertia of metal valving mechanisms simply will not permit this reciprocating motion to occur within a few thousandths of a second.

SUMMARY OF THE INVENTION

An apparatus is provided for controlling the release of a pressurized fluid so as to generated an acoustic or shock wave impulse for use in determining the geophysical structure of the earth beneath the ocean bed. The sound wave generator comprises:

(1) a generator housing defining an internal compressed fluid chamber;

(2) first and second end members, each cooperating with the housing to define first and second annular chambers for receiving;

(3) first and second piston members comprising open-ended cylinders; and (4) means for shifting the pistons in sequence in the same direction to
  (a) open a series of generator housing exhaust ports, thereby exhausting a predetermined amount of compressed fluid to generate a sound wave, and
  (b) cause the second piston member to close the exhaust ports to effect a "pulse" of compressed fluid.

In the "firing" position, the two piston members engage one another so as to form a fluid seat therebetween, with the first piston covering the exhaust port to preclude flow of compressed fluid therefrom. The first piston member then slides within its annular chamber, opening the exhaust ports and releasing a supply of pressurized fluid from the generator housing. Immediately thereafter, the second piston member follows the first piston member, in the same direction, closing the exhaust ports after a pulse of compressed fluid in a predetermined time interval, has been emitted from the generator housing. The first and second piston members are then again urged in sealing engagement with one another so as to preclude further flow of fluid pressure from the generator housing interval chamber.

BRIEF DESCRIPTION OF THE DRAWINGS

FIG. 3 is a sectional view of an alternative embodiment of the sound wave impulse generator of the present invention in its "steady-state" position.

DETAILED DESCRIPTION OF THE INVENTION

Figure 1:
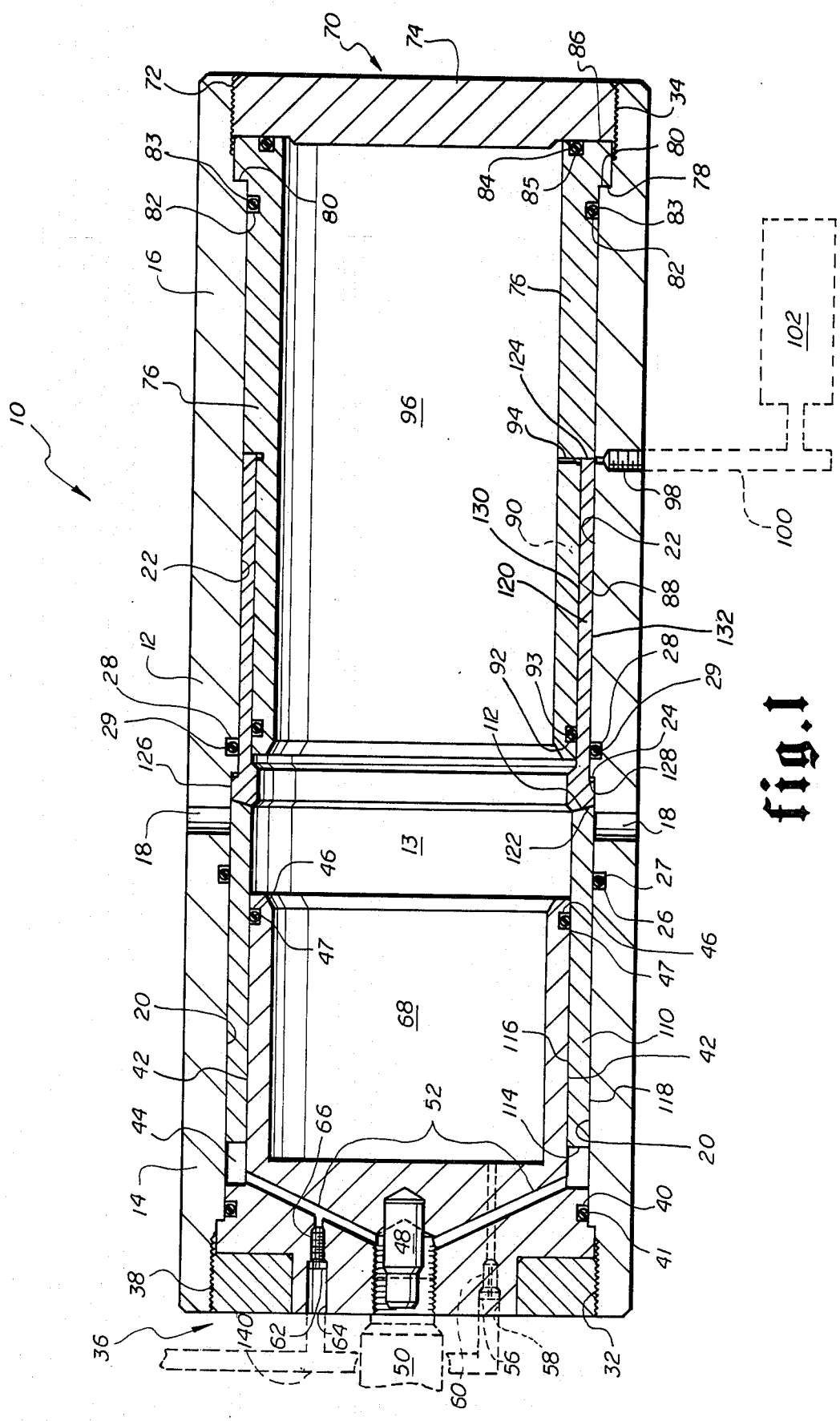
FIG. 1 is a sectional view of the sound wave impulse generator of the present invention shown in its "steady-state" position ready to emit acoustic impulses.

Turning now to the drawings and more specifically to FIG. 1, the preferred embodiment of the acoustic impulse generator of the present invention is shown illustrated by the numeral 10, comprising five major elements. The generator housing 12 is the main body portion of the device, defining an internal chamber 13 for retaining a supply of compressed fluid or gas. The housing 12 includes first and second ends 14 and 16, respectively, in which are fitted first and second end cap portions 36 and 70, respectively, which will be described in detail hereinbelow. A plurality of circumferentially spaced exhaust ports 18 are positioned approximately mid-way between the housing ends 14 and 16, and serve to exhaust the supply of compressed fluid within the housing chamber 13 to create the acoustic, or shock wave impulse.

The housing 12 contains a first internal axial bore 20 located at the first end 14 thereof and extending into the housing chamber section 13, past the circumferentially spaced exhaust port 18 and terminating in a stepped ledge 24. A second internal machined axial bore 22 extends from the housing second end 16 into the housing chamber 13 and is of a slightly smaller diameter than the first bore 20 in order to provide the stepped annular ledge 24 concentric with the axes of the first and second axial bores 20 and 22.

First and second O-ring channels, 26 and 28, respectively, retaining respective O-rings 27 and 29, are located in the machined surfaces of the first and second internal bores 20 and 22, and provide fluid seals between the internal working elements of the impulse generator 10, explained in detail hereinbelow. The generator housing 12 is internally threaded 32 and 34, at its first and second ends, respectively, for receiving respective first and second end cap portions 36 and 70.

The first end cap portion 36 includes first external machine threads 38 for mating with the generator housing first internal threads 32 for retaining same in functional alignment. A third O-ring channel 40, retaining a third O-ring 41, is located on an exterior surface of the first end cap portion 36 in order that the O-ring may provide a fluid seal between mating surfaces of the generator housing 12 and first end cap 36.

The first end cap portion 36 includes a first external machined surface 42 extending into the housing chamber 13 when the first end cap is in functional position. This first machined surface 42 combines with the first internal machined axial bore 20 of the generator housing 12 to form a first machined annular chamber 44 for receiving a first piston means 110 therein. A fourth O-ring channel 46 is machined into the external surface 42 and retains a fourth O-ring 47 for providing a fluid seal between first end cap portion 36 and the first piston means 110.

As best shown in the drawings, the first end cap portion 36 includes a third internal bore 48 in which is mounted a first solenoid controlled pneumatic two-way valve 50 for controlling the flow of air pressure into the bore. First internal passageways 52 provide communication between the third internal bore 48 and the first annular chamber 44 so that fluid pressure supplied to the bore will enter the annular chamber and act upon the first piston means 110 as will be described hereinbelow.

A second internal passageway 56 interconnects a first fluid flow port 58 with a first restrictive fluid flow orifice 60 for supplying compressed fluid at a regulated rate to a first end cap chamber 68 and ultimately to the generator housing chamber 13. A third internal passageway 62 interconnects a second fluid flow port 64 with a second restrictive fluid flow orifice 66 for supplying compressed fluid at a regulated rate to the first internal passageway 52 and ultimately to the first annular chamber 44 as will be explained in greater detail hereinbelow. The two external fluid flow ports 58 and 64 are connected to a continuous common supply of pressurized fluid. Also as will be explained hereinbelow, the first restrictive orifice 60 is somewhat larger than the second restrictive orifice 66 in order that pressurized fluid flow common to both will result in a pressure differential between the first end cap chamber 68 and the first internal passageway 52 during operation of the sound wave impulse generator 10.

A second end cap portion 70 is threadedly inserted into the opposite end 16 of the generator housing 12 by means of second external machine threads 72 engaging generator housing second internal threads 34. In the preferred embodiment, this second end cap portion 70 comprises an end member 74 and an annular member 76. The depth that the end cap portion annular member 76 is inserted into the generator housing 12 is somewhat critical and is therefore controlled by an annular ledge 78 abutting a mating annular ledge 80 of the generator housing second end 16. A fluid seal is effected between this end cap portion annular member 76 and the generator housing end 16 by a fifth O-ring 83 positioned in its O-ring channel 82. A sixth O-ring 85 is positioned in its channel 84 machined into an annular end surface 86 of the second end cap portion annular member 76 to provide a fluid seat between the annular member and the mating end member 74. This second end cap portion end member 74 and annular member 76 define a second end cap chamber 96 communicating with the generator housing chamber 13 and first end cap chamber 68 for retaining the supply of compressed fluid to be released.

The second end cap annular member 76 includes a second external machined surface 88 concentric with the generator housing second internal machined axial bore 22 to form a second annular chamber 90 for receiving a second piston means 120. This end member 76 also includes a seventh O-ring channel 92, retaining a seventh O-ring 93, for providing a fluid seal between a machined inner surface 130 of the second piston means 120 and the mating second end cap member external machine surface 88.

The second end cap portion annular member 76 includes a third restrictive flow orifice 94 providing communication between the second end cap chamber 96 and the second annular chamber 90, in order that in steady-state condition, pressure within the chamber 96 will be exerted on a second piston 120 within chamber 90.

A first piston member 110 comprises an open ended cylinder having machined smooth inner and outer surfaces 116 and 118, respectively, and first and second end surfaces 112 and 114. This first piston member 110 is adapted to slide axially within the first annular chamber 44 in order to open and close the generator housing circumferentially spaced ports 18. O-ring 27 provides a fluid seat between the housing first internal axial bore 20 and the piston member outer surface 118. Similarly, O-ring 47 provides a fluid seal between the first end cap portion external surface 42 and the first piston member inner surface 116. As shown in FIG. 1, the first piston member 110 covers the opening to the circumferential port 18 in order to preclude the flow of compressed gas from within the housing chamber 13.

A second piston member 120 includes machined concentric inner and outer surfaces 130 and 132 and first and second end surfaces 122 and 124 and is adapted to slide axially within the second annular chamber 90. The second piston member 120 also includes a collar 126 which forms an annular surface 128 for butting against the generator housing stepped annular ledge 24, as best shown in FIG. 1, for regulating the distance the second piston member travels within the chamber.

The generator housing second end 16 includes an optional third fluid flow port 98 communicating with the second annular chamber 90. This port 98 is connected by conduit 100 to an optional external pressurized fluid reservoir 102 to aid in "firing" the impulse generator as will be described in detail hereinbelow.

In operation, the acoustic impulse generator 10 is suspended in the water behind and/or below a vessel moving slowly through the water. Typically a detecting mechanism is dragged behind the boat a finite distance from the impulse generator 10 and is electrically or mechanically connected to a means for recording sound or shock waves as they are reflected off of the geophysical structure beneath the ocean bed. In this manner, it is possible to "draw a picture" of the various layers of sediment, rock, oil and gas formations, etc. beneath the ocean bed.

The acoustic impulse generator 10 of the present invention is connected to a continuous high pressure line of compressed fluid or gas at a "T" connection 140 such that this compressed gas, on the order of 2,000 psi, is constantly supplied to respective first and second restrictive fluid flow orifices 60 and 66 and ultimately to the generator housing chamber 13 and first annular chamber 44. In equilibrium or steady-state condition, solenoid controlled two-way valve 50 is closed, preventing an escape of fluid pressure through the second restrictive flow orifice 66, the first internal passageway 52 and out the two-way valve.

This continuous fluid pressure at the second fluid flow port 64 acts against the first piston member second annular surface 114 to urge the piston member in pressure sealing engagement with the second piston member first annular surface 122 so as to prevent the escape of any fluid pressure build up within chamber 13 through the circumferentially spaced ports 18. Thereafter, with the fluid pressurization of the first annular chamber 44 and the effectuation of a positive fluid seal between respective mating annular surfaces of first and second piston members 110 and 120, pressurized fluid at the first fluid flow port 58 and first restrictive flow orifice 60, causes a subsequent repressurization of the generator housing internal chamber 13. Fluid pressure maintained within the first annular chamber 44 urges the first piston member 110 toward its first position to the right as shown in FIG. 1, closing the port 18 to prevent exhaustion of the air or other compressed fluid within the housing chamber 13.

As shown in the drawings, the internal chambers 13 and 96 communicate with the second annular chamber 90 via the third restrictive flow orifice 94 so that, in steady-state or equilibrium condition, fluid pressure within the housing chamber 13 acts on second piston member second end surface 124, producing a force to urge the second piston member 120 against the first piston member 110. As pointed out hereinabove, the first piston member second annular surface 114 is larger than the second piston member second annular surface 124 in order that, in steady-state condition, a greater net force acts upon the first piston member surface 114 than on the second piston member surface 124 to retain both piston members in position as shown in FIG. 1.

As shown in the drawings, fluid seals are effected between respective piston member inner surfaces and respective end cap portion external machine surfaces by O-rings 47 and 93 in respective O-ring channels 46 and 92. Likewise, fluid seals are effected between respective piston member outer surfaces and respective housing internal machined axial bores 20 and 22 by O-rings 27 and 29 set in their respective channels 26 and 28.

Since there is no O-ring or similar seal between first and second piston member mating surfaces 112 and 122, molecules of the fluid medium contained within chamber 13 tend to seep between the surfaces and tend to separate the first and second piston members 110 and 120 slightly. This amount of fluid, however, is not enough to overcome the steady-state fluid pressure force acting upon opposing surfaces 114 and 124 of the respective piston members. It is sufficient, however, to separate the first and second piston members 110 and 120 in the event pressure force is suddenly removed from one of the piston rear annular surfaces, as will be explained hereinbelow.

Figure 2:
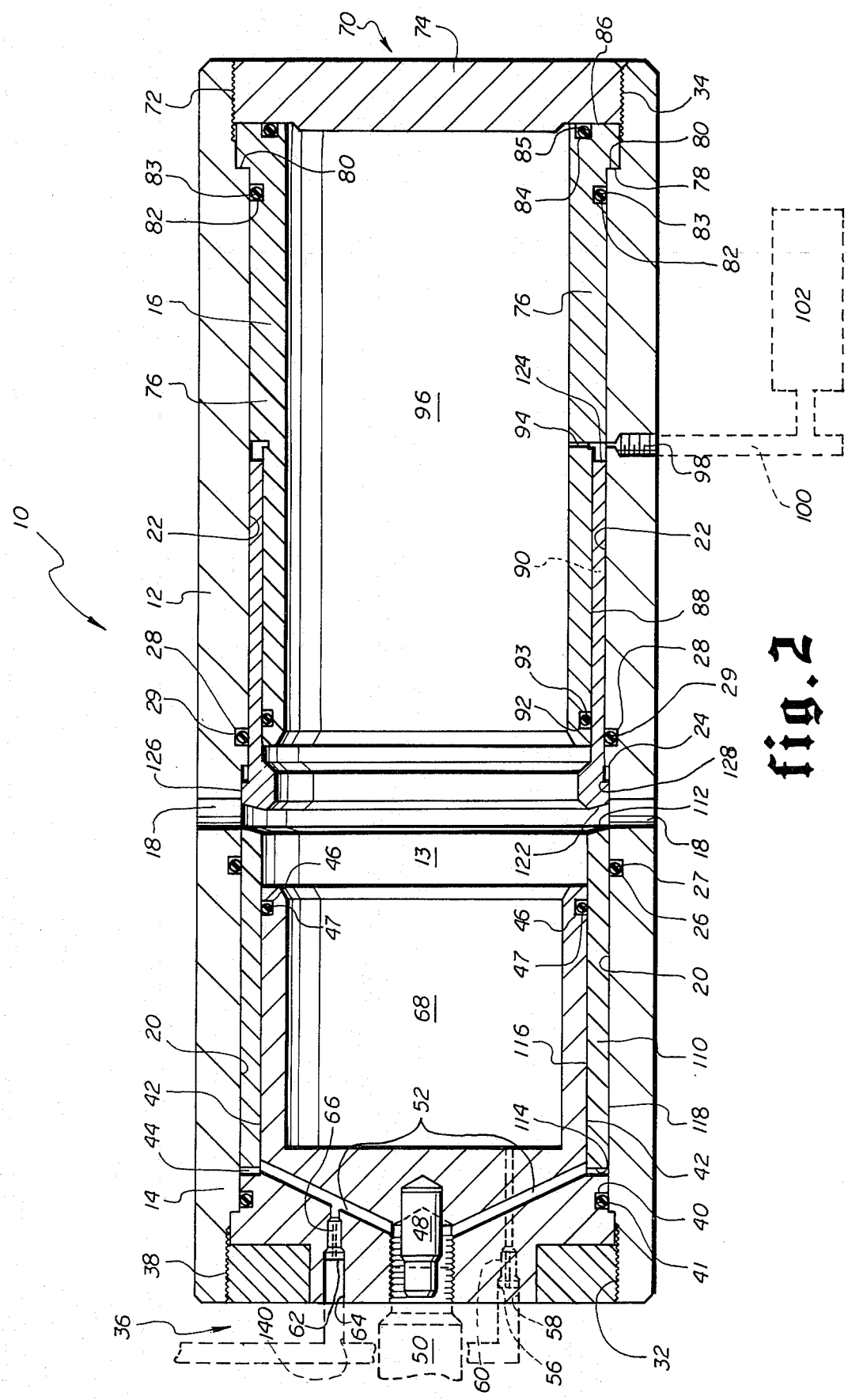
FIG. 2 is a vertical sectional view of the sound wave impulse generator of the present invention shown in firing mode with the same direction.

To "fire" the impulse generator 10, solenoid controlled two-way valve 50 is opened for a brief time period (20-100 msec), permitting the fluid pressure contained within the first annular chamber 44 to exhaust through the first internal passageways 52 and into a storage tank, or to atmosphere. With the pressure force acting on first piston member annular surface 114 suddenly zero, the aforementioned fluid molecules that have wedged their way between first and second piston piston member annular mating surfaces 112 and 122 separate the piston members sufficiently to effect a net force on piston member annular surface 112 to drive the first piston member 110 away from the second piston member 120 (to the left as shown in FIGS. 1 and 2). This driving pressure is maintained upon first piston member annular surface 112 for a finite period of time as the piston member slides to the left and before surface 112 reaches a circumferential exhaust port 18. The inertia of the first piston member 110 is sufficient to carry it to its "bottomed-out" position within the first annular chamber 44, even though the pressure force is greatly reduced when piston surface 112 reaches a port 18 and the pressure permitted to vent.

As the first piston member first annular surface 112 crosses the exhaust port 18 compressed fluid within housing chamber 13 is released to create an acoustic impulse or shock wave to be reflected off various of the earth's layers beneath the ocean bed. This sudden decrease in fluid pressure force at second piston member annular surface 122 causes a temporary pressure, and therefore force, differential between opposing annular surface of the second piston member 120. As compressed fluid is exhausted through ports 18, the pressure on surface 122 drops to zero, while fluid pressure acting on the opposing annular surface 124 is retained briefly and tends to urge the second piston member 120 toward the left as shown in FIGS. 1 and 2.

The third restrictive flow orifices 94 restricts the flow of fluid from the second annular chamber 90 back into the housing chamber 13 in order to maintain sufficient differential fluid pressure to shift the second piston member 120 toward its second position (to the left as shown in FIGS. 1 and 2), in order that mating surfaces 112 and 122 of respective first and second piston members again cooperate to form a tight fluid seal to prevent the further escape of compressed fluid from within the housing chamber 13 through the exhaust ports 18.

With the first and second piston members again in fluid sealing engagement, fluid pressure within chamber 13 is maintained. During this time, the solenoid controlled two-way valve 50 is venting fluid pressure from first internal passageways 52 to the atmosphere. Additionally, continuous pressurized fluid at a second air flow port 64 is being vented to atmosphere through the two-way valve 50, but is restricted by orifice 66, which is much smaller than first restrictive orifice 60, thereby permitting the housing chamber 13 to repressurize.

Sometime thereafter, solenoid controlled two-way valve 50 is closed, permitting fluid pressure to build within the first internal passageways 52 and first annular chamber 44. When the pressure in the first annular chamber 44 closely approximates the fluid pressure in the housing chamber 13, and hence the second annular chamber 90, a greater net force acting on first piston member second annular surface 114 (due to the first piston member second annular surface being larger than the second piston member second annular surface 124) causes first and second piston members 110 and 120 to shift from their second positions back to their respective first positions, as shown in FIG. 1, while maintaining a fluid seal sufficient to retain fluid pressure within chamber 13 as the junction of mating surfaces 112 and 122 passes over the circumferentially spaced ports 18. When the pressure within the housing chamber 13 again rises to operating pressure (about 2,000 psi), the acoustic impulse generator 10 is ready to "fire" again, and the sequence of steps outlined hereinabove is repeated.

An optional external pressurized fluid reservoir 102 aids in shifting the second piston member 120 from its first to its second position by reserving a supply of compressed fluid, at operating pressure and supplying same to second piston member second end surface 124, unaffected by any pressure drop within chambers 13 and 96.

An alternative embodiment of the present invention is shown in FIG. 3, generally illustrated by the numeral 210. As in the preferred embodiment, a generator housing 212 comprises the main body portion of the device, forming an internal chamber 213 for retaining a supply of compressed fluid or gas. A plurality of circumferentially spaced ports 218 are spaced mid-way between the ends of housing 212 and serve to exhaust the supply of compressed fluid within the housing chamber 213 to create the acoustic impulse.

The alternative embodiment of the generator housing 212 is of a tubular or cylindrical configuration, open at each end thereof, and including first and second internal machine threads, 232 and 234 in respective ends thereof. A first end cap portion 236 is threadedly inserted into a first end of the generator housing 212 by first external machine threads 238 mating with first internal machine threads 232 of the housing 212. This first end of the generator housing 212 includes a first O-ring channel 240 adjacent the first internal machine threads 232, which channel retains a first O-ring 241 for engaging with a machined surface 237 of the first end cap portion 236 in order to provide a fluid seal therebetween.

A second end cap portion 260 is threadedly inserted into the generator housing 212 at the end opposite the first end cap portion 236 by means of second external machine threads 262 mating with generator housing second internal machine threads 234. Similarly, this second end of the generator 212 includes a second O-ring channel 264 retaining a second O-ring 265 which mates with a machined surface 263 of the second end cap portion 260 to provide a fluid seal therebetween.

The generator housing 212 includes an external machined surface 242 forming an annular recess 244 terminating in first and second annular Ledges 246 and 248, respectively. An external shifting cylinder 250 is positioned outside of the generator housing 212 and concentric thereto in order to shift first and second piston members 270 and 280 to "fire" the impulse generator 210 as will be explained hereinbelow.

The external shifting cylinder 250 includes an internal machined surface 252 terminating in third and fourth annular Ledges 254 and 256, respectively, which internal surface cooperates with the generator housing annular recess 244 to form an annular chamber 216 for retaining first and second piston members 270 and 280. The cylinder 250 also includes a plurality of circumferentially spaced ports 258 in Line with the generator housing exhaust ports 218 in order that the external cylinder will not interfere with the pulse of compressed fluid emanating from the generator housing internal chamber 213.

The sound wave impulse generator 210 includes first and second piston members 270 and 280, each having respective mating first end surfaces 272 and 282, respective second end surfaces 274 and 284 and respective machined inner surfaces 276 and 286. As in the preferred embodiment, each respective piston member 270 and 280 shifts between a first position, wherein the first piston member closes the exhaust ports 218, and a second position, wherein the second piston member closes the exhaust ports, and the ports are open momentarily as the piston members shift from their respective first to second positions. Additionally, this alternative embodiment 210 is so designed that the exhaust ports 218 are again open momentarily as the piston members shift from their respective second to first positions in the same manner as in shifting from first to second position.

The generator housing 212 includes third and fourth O-ring channels, 226 and 228, retaining respective third and fourth O-rings 227 and 229 for providing fluid seals between engaging generator housing machined surfaces 242 and respective first and second piston member machined inner surfaces 276 and 286. Additionally, this alternative embodiment includes an external fluid flow port 266 connecting a restrictive flow orifice 268 which communicates with the internal chamber 213 to supply compressed fluid thereto from a remote source (not shown).

The operation of the alternative embodiment of the present invention is similar to that of the preferred embodiment, except that the "firing" of the alternative embodiment is mechanical, whereas the preferred embodiment is "fired" by pneumatic means. Initially, the external shifting cylinder 250 is urged to the left by some mechanical means (not shown) with sufficient force to shift the first and second piston members 270 and 280 into their respective first positions, as in the preferred embodiment, and to effect a fluid seal between respective first and second piston member mating first end surfaces 272 and 282. At this time, compressed fluid is introduced through air flow port 266 and restrictive flow orifice 268 to pressurize the generator housing internal chamber 213 to the recommended operating pressure.

When it is desired to "fire" the generator, the external shifting cylinder 250 is rapidly shifted to the left (as shown in FIG. 3) by some external mechanical means (not shown). As in the preferred embodiment, molecules of a fluid medium have managed to wedge their way between the mating first and second piston member first end surfaces 272 and 282 so that, when the force applied by the external shifting cylinder third annular ledge 254 acting upon the first piston member second end surface 274 is released, the aforementioned fluid molecules that have wedged their way between first and second piston members separate the piston members to produce a net fluid pressure force on the first piston member first end surface 272 sufficient to drive the first piston member 270 away from the second piston member 280 (to the left as shown in FIG. 3). As in the preferred embodiment, this driving pressure is maintained for a sufficient time to allow the first piston member inertia to carry it to its "bottomed-out" position against the generator housing first annular ledge 246, even though the pressure force is greatly reduced when the first piston inner surface 276 reaches port 218 and the pressure is permitted to vent.

At a finite time later (determined by the speed and acceleration of the external shifting cylinder 250 and the initial distance between the shifting cylinder fourth annular ledge 256 and the second piston member second end surface 284), the external shifting cylinder fourth annular ledge 256 engages the second piston member second end surface 284 to urge the second piston member 280 to the left (as shown in FIG. 3) and against mating first piston member first annular surface 272 to again effect a fluid seal therebetween to prevent the further escape of compressed fluid from within the housing chamber 213 through the exhaust ports 218.

With the first and second piston members again in fluid sealing engagement, fluid pressure within chamber 213 is regained and maintained. At this time, the generator 210 may again be "fired" exactly as outlined hereinabove, except that the motion of all moving parts is directed toward the right as shown in FIG. 3, rather than to the left.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of this invention without departing from the scope thereof, it is to be understood that all matter herein set forth or shown in the accompanying drawings is to be interpreted as illustrative and not in a limiting sense.

The invention having been described, what is claimed is:

1. A device for instantaneously producing the release of a pressurized fluid for generating controlled acoustic impulses comprising:
   (a) a body portion defining a hollow, enclosed chamber communicating with the environmental exterior via an exhaust port;
   (b) a first piston member slidably mounted with respect to said body portion shiftable between
       a first position closing said exhaust port and
       a second position opening said exhaust port;
   (c) a second piston member slidably mounted with respect to said body portion shiftable between
       a first position opening said exhaust port, and
       a second position closing said exhaust port;
   (d) means for introducing compressed fluid into said body chamber;
   (e) means for causing said first piston member to move from its first position to its second position, opening said exhaust port and thereby controllably releasing a volume of pressurized fluid creating an acoustic impulse;
   (f) means for causing said second piston member to move immediately thereafter from its first position to its second position, closing said exhaust port and interrupting said release of pressurized fluid and acoustic impulse; and
   (g) means for thereafter returning said first and second piston members to their respective first positions so as to prepare said device for generating subsequent controlled acoustic impulses.

2. The device as set forth in claim 1, wherein said first and second piston members include first mating annular surfaces that abut one another in sealing engagement when said piston members are in there respective first and second positions and include second annular surfaces at the ends opposite said first annular surfaces, and wherein said piston members move in the same direction when shifting from their respective first to second positions to temporarily open said exhaust port and immediately thereafter close said port.

3. The device as set forth in claim 2, wherein said first piston member second annular surface is larger than said second piston member second annular surface, for creating a net force urging said first piston member against said second piston member and for urging both of said piston members to their respective first positions when said respective piston second annular surfaces are exposed to steady-state fluid pressure.

4. The device as set forth in claim 2, wherein said means for causing said first and second piston members to move from respective first to second positions comprises a valve shiftable between
    a first position wherein fluid pressure is maintained within said device in steady-state condition, and
    a second position wherein such fluid pressure acting on said first piston member second annular surface is vented to atmosphere, whereupon a greater net force acting upon said first piston member first annular surface causes said first piston member to shift from its first position to its second position, thereby opening said exhaust port, and whereupon a greater net force acting upon said second piston member second annular surface causes said second piston member to immediately shift from its first position to its second position, thereby closing said exhaust port, thereby releasing a conrolled acoustic impulse from said body chamber.

5. The device as set forth in claims 1, 2 or 3, wherein said body portion includes first and second end cap portions, each having a surface concentric with said body portion defining a concentric chamber within said body portion for receiving said respective first and second piston members within said body portion.

6. The device as set forth in claims 1, 2 or 3, wherein said first and second piston members comprise hollow, open-ended cylinders concentrically positioned around the exterior of said body portion, and said means for causing said second piston member to shift from its first position to its second position comprises a hollow, open-ended cylinder concentrically positioned around said second piston member and having a port therein in line with said body exhaust port, said moving means including an annular surface therewith for engaging said second piston member to shift said member from its first to its second position.

7. The device as set forth in claim 5, including a supplemental chamber communicating with said second annular chamber.

8. A device for controlling the release of a pressurized fluid for generating controlled acoustic impulses comprising:
   (a) a body portion defining a longitudinal chamber and having a plurality of circumferentially spaced exhaust ports for releasing pressurized fluid from within said chamber;
   (b) a first end cap portion sealably attached to a first end of said body portion and defining a first annular chamber between said body and said end cap portion;
   (c) a second end cap portion sealably attached to a second end of said body portion and defining a second annular chamber between said body and said end cap portions;
   (d) a first piston means slidably positioned within said first annular chamber and adapted to shift between a first position closing said exhaust ports and a second position opening said exhaust ports;
   (e) a second piston means slidably positioned within said second annular chamber and adapted to shift between a first position opening said exhaust ports and a second position closing said exhaust ports; and
   (f) means for introducing a pressurized fluid into said body portion chamber,
wherein pressurized fluid is introduced into said body chamber and said first and second piston means cooperate with one another when in their respective first positions to maintain the pressurized fluid in said body chamber, and wherein the fluid is released when said first piston means shifts to its second position, thereby opening said exhaust ports, and wherein said second piston means immediately follows said first piston means in the same direction to again cooperate with said first piston means when in their respective second positions to close said exhaust ports to again maintain fluid pressure within said body chamber.

9. The device as set forth in claim 8, wherein said first end portion includes:
    (a) a first passageway communicating with said first annular chamber;
    (b) a first restrictive flow orifice communicating with said body portion chamber;
    (c) first inlet communicating with said first restrictive flow orifice;
    (d) a second restrictive flow orifice communicating with said first passageway; and
    (e) a second inlet communicating with said second restrictive flow orifice; and
wherein said second end portion includes a third restrictive flow orifice communicating between said body chamber and said second annular chamber.

10. The device as set forth in claim 9, including a supplemental chamber communicating with said second annular chamber.

11. The device as set forth in claim 8, wherein said first piston means and said second piston means each define hollow, open-ended cylinders having respective first and second annular surfaces, and wherein said respective first annular surfaces are adapted to cooperate with each other to maintain pressurized fluid within said body chamber, and wherein said respective second annular surfaces are exposed to fluid pressure whereby said pressure may shift said piston means between their respective first and second positions.

12. The device as set forth in claim 11, wherein said first piston means second annular surface is larger than said second piston means second annular surface whereby a uniform fluid pressure exposed to each said second annular surface shifts said piston means to their respective first positions.

13. A device for instantaneously producing the release of a pressurized fluid for generating controlled acoustic impulses comprising:
    (a) a body having:
        (1) an internal chamber, and
        (2) a port communicating with said chamber,
    (b) first and second piston means sequentially actuated to instantaneously and respectively open said port and thereafter close said port, to thereby instantaneously release a predetermined volume of pressurized fluid to produce an acoustic impulse.

14. A device for instantaneously producing the release of a pressurized fluid for generating controlled acoustic impulses comprising:
    (a) a body portion defining a hollow, enclosed chamber communicating with the environmental exterior via an exhaust port;
    (b) a first piston member slidably mounted with respect to said body portion shiftable between
        a first position closing said exhaust port and
        a second position opening said exhaust port;
    (c) a second piston member slidably mounted with respect to said body portion shiftable between
        a first position opening said exhaust port, and
        a second position closing said exhaust port;
    (d) means for introducing compressed fluid into said body chamber;
    (e) means for causing said first piston member to move from its first position to its second position, opening said exhaust port and thereby controllably releasing a volume of pressurized fluid creating an acoustic impulse;
    (f) means for causing said second piston member to move immediately thereafter from its first position to its second position, closing said exhaust port and interrupting said release of pressurized fluid and acoustic impulse; and
    (g) means for thereafter returning said first and second piston members to their respective first positions so as to prepare said device for generating subsequent controlled acoustic impulses,
    said first and second piston members include first mating annular surfaces that abut one another in sealing engagement when said piston members are in their respective first and second positions and include second annular surfaces at the ends opposite said first annular surfaces, and wherein said piston members move in the same direction when shifting from their respective first to second positions to temporarily open said exhaust port and immediately thereafter close said port.

15. The device of claim 14 wherein said first piston member second annular surface is larger than said second piston member second annular surface, for creating a net force urging said first piston member against said second piston member and for urging both of said piston members to their respective first positions when said respective piston second annular surfaces are exposed to steady-state fluid pressure.

16. The device as set forth in claim 14 wherein said means for causing said first and second piston members to move from respective first to second positions comprises a valve shiftable between
    a first position wherein fluid pressure is maintained within said device in steady-state condition, and
    a second position wherein such fluid pressure acting on said first piston member second annular surface is vented to atmosphere, whereupon a greater net force acting upon said first piston member first annular surface causes said first piston member to shift from its first position to its second position, thereby opening said exhaust port, and whereupon a greater net force acting upon said second piston member second annular surface causes said second piston member to immediately shift from its first position to its second position, thereby closing said exhaust port, thereby releasing a controlled acoustic impulse from said body chamber.

17. A device for instantaneously producing the release of a pressurized fluid for generating controlled acoustic impulses comprising:
    (a) a body portion defining a hollow, enclosed chamber communicating with the environmental exterior via an exhaust port;
    (b) a first piston member slidably mounted with respect to said body portion shiftable between
        a first position closing said exhaust port and
        a second position opening said exhaust port;
    (c) a second piston member slidably mounted with respect to said body portion shiftable between
        a first position opening said exhaust port, and
        a second position closing said exhaust port;
    (d) means for introducing compressed fluid into said body chamber;
    (e) means for causing said first piston member to move from its first position to its second position, opening said exhaust port and thereby controllably releasing a volume of pressurized fluid creating an acoustic impulse;
    (f) means for causing said second piston member to move immediately thereafter from its first position to its second position, closing said exhaust port and interrupting said release of pressurized fluid and acoustic impulse; and (g) means for thereafter returning said first and second piston members to their respective first positions so as to prepare said device for generating subsequent controlled acoustic impulses, wherein said first and second piston members comprise hollow, open-ended cylinders concentrically positioned around the exterior of said body portion, and said means for causing said second piston member to shift from its first position to its second position comprises a hollow, open-ended cylinder concentrically positioned around said second piston member and having a port therein in line with said body exhaust port, said moving means including an annular surface therewith for engaging said second piston member to shift said member from its first to its second position.

18. A device for instantaneously producing the release of a pressurized fluid for generating controlled acoustic impulses comprising:

(a) a body portion defining a hollow, enclosed chamber communicating with the environmental exterior via an exhaust port;

(b) a first piston member slidably mounted with respect to said body portion shiftable between
a first position closing said exhaust port and
a second position opening said exhaust port;

(c) a second piston member slidably mounted with respect to said body portion shiftable between
a first position opening said exhaust port, and
a second position closing said exhaust port;

(d) means for introducing compressed fluid into said body chamber;

(e) means for causing said first piston member to move from its first position to its second position, opening said exhaust port and thereby controllably releasing a volume of pressurized fluid creating an acoustic impulse;

(f) means for causing said second piston member to move immediately thereafter from its first position to its second position, closing said exhaust port and interrupting said release of pressurized fluid and acoustic impulse; and (g) means for thereafter returning said first and second piston members to their respective first positions so as to prepare said device for generating subsequent controlled acoustic impulses,
said first and second piston members comprise hollow, open-ended cylinders concentrically positioned around the exterior of said body portion, and said means for causing said second piston member to shift from its first position to its second position comprises a hollow, open-ended cylinder concentrically positioned around said second piston member and having a port therein in line with said body exhaust port, said moving means including an annular surface therewith for engaging said second piston member to shift said member from its first to its second position.

19. A device for instantaneously producing the release of a pressurized fluid for generating controlled acoustic impulses comprising:

(a) a body portion defining a hollow, enclosed chamber communicating with the environmental exterior via an exhaust port;

(b) a first piston member slidably mounted with respect to said body portion shiftable between
a first position closing said exhaust port and
a second position opening said exhaust port;

(c) a second piston member slidably mounted with respect to said body portion shiftable between
a first position opening said exhaust port, and
a second position closing said exhaust port;

(d) means for introducing compressed fluid into said body chamber;

(e) means for causing said first piston member to move from its first position to its second position, opening said exhaust port and thereby controllably releasing a volume of pressurized fluid creating an acoustic impulse;

(f) means for causing said second piston member to move immediately thereafter from its first position to its second position, closing said exhaust port and interrupting said release of pressurized fluid and acoustic impulse; and said first and second piston member comprising hollow, open-ended cylinders concentrically positioned around the exterior of said body portion, and said means for causing said second piston member to shift from its first position to its second position comprises a hollow, open-ended cylinder concentrically positioned around said piston member and having a port therein in line with said body exhaust port, said moving means including an annular surface therewith for engaging said second piston member to shift said member from its first to its second position.

20. A device for controlling the release of pressurized fluid for generating controlled acoustic impulses comprising:

(a) a body portion defining a longitudinal chamber and having a plurality of circumferentially spaced exhaust ports for releasing pressurized fluid from within said chamber;

(b) a first end cap portion sealably attached to a first end of said body portion and defining a first annular chamber between said body and said enc cap portion;

(c) a second end cap portion sealably attached to a second end of said body portion and defining a second annular chamber between said body and said end cap portions;

(d) a first piston means slidably positioned within said first annular chamber and adapted to shift between
a first position closing said exhaust ports and a second position opening said exhaust ports;

(e) a second piston means slidably positioned within said second annular chamber and adapted to shift between a first position opening said exhaust ports and a second position closing said exhaust ports; and (f) means for introducing a pressurized fluid into sand body portion chamber, wherein pressurized fluid is introduced into said body chamber and said first and second piston means cooperate with one anothe when in their respective first positions to maintain the pressurized fluid in said body chamber, and wherein the fluid is released when said first piston means shifts to its second position, thereby opening said exhaust pots, and wherein said second piston means immediately follows said first piston means in the same direction to again cooperate with said first piston means when in their respective second positions to close said exhaust ports to again maintain fluid pressure within said body chamber, wherein said first end portion includes:
(a) a first passageway communicating with said first annular chamber;
(b) a first restrictive flow orifice communicating with said body portion chamber;
(c) first inlet communicating with said first restrictive flow orifice;
(d) a second restrictive flow orifice communicating with said first passageway; and
(e) a second inlet communicating with said second restrictive flow orifice; and wherein said second end portion includes a third restrictive flow orifice communicating between said body chamber and said second annular chamber.

21. The device as set forth in claim 20, including a supplemental chamber communicating with said second annular chamber.

22. A device for controlling the release of a pressurized fluid for generating controlled acoustic impulses comprising:
(a) a body portion defining a longitudinal chamber and having a plurality of circumferentially spaced exhaust ports for releasing pressurized fluid from within said chamber;
(b) a first end cap portion sealably attached to a first end of said body portion and defining a first annular chamber between said body and said end cap portion;
(c) a second end cap portion sealably attached to a second end of said body portion and defining a second annular chamber between said body and said end cap portions;
(d) a first piston means slidably positioned within said first annular chamber and adapted to shift between a first position closing said exhaust ports and a second position opening said exhaust ports;
(e) a second piston means slidably positioned within said second annular chamber and adapted to shift between a first position opening said exhaust ports and a second position closing said exhaust ports; and
(f) means for introducing a pressurized fluid into said body portion chamber, wherein pressurized fluid is introduced into said body chamber and said first and second piston means cooperate with one another when in their respective first positions to maintain the pressurized fluid in said body chamber, and wherein the fluid is released when said first piston means shifts to its second position, thereby opening said exhaust ports, and wherein said second piston means immediately follows said first piston means in the same direction to again cooperate with said first piston means when in their respective second positions to close said exhaust ports to again maintain fluid pressure within said body chamber, said first piston means and said second piston means each define hollow, open-ended cylinders having respective first and second annular surfaces, and wherein said respective first annular surfaces are adapted to cooperate with each other to maintain pressurized fluid within said body chamber, and wherein said respective second annular surfaces are exposed to fluid pressure whereby said pressure may shift said piston means between their respective first and second positions, said first piston means second annular surface is larger than said second piston means second annular surface whereby a uniform fluid pressure exposed to each said second annular surface shifts said piston means to their respective first positions.

* * * * *